(12) United States Patent
Cho

(10) Patent No.: US 7,795,845 B2
(45) Date of Patent: Sep. 14, 2010

(54) RECHARGEABLE BATTERY MODULE HAVING A COOLING MECHANISM

(75) Inventor: Kyu-Woong Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 362 days.

(21) Appl. No.: 11/375,332

(22) Filed: Mar. 13, 2006

(65) Prior Publication Data

US 2006/0214633 A1 Sep. 28, 2006

(30) Foreign Application Priority Data

Mar. 25, 2005 (KR) .................. 10-2005-0024867

(51) Int. Cl.
*H02J 7/04* (2006.01)
*H02J 7/16* (2006.01)

(52) U.S. Cl. .................. 320/150; 320/107; 320/112; 429/120; 429/148; 429/154

(58) Field of Classification Search .............. 320/107, 320/110, 112, 126, 150, 116; 429/99, 120, 429/148, 149, 154; 62/239
See application file for complete search history.

(56) References Cited

U.S. PATENT DOCUMENTS

| 5,558,949 A | * | 9/1996 | Iwatsuki et al. ............... 429/99 |
| 5,585,204 A | * | 12/1996 | Oshida et al. ............... 429/62 |
| 5,726,495 A | * | 3/1998 | Aihara et al. ............... 257/722 |
| 5,866,276 A | | 2/1999 | Ogami et al. |
| 6,007,942 A | * | 12/1999 | Mistry ....................... 429/100 |
| 6,094,927 A | * | 8/2000 | Anazawa et al. ............ 62/239 |
| 6,106,972 A | * | 8/2000 | Kokubo et al. .............. 429/120 |
| 6,340,877 B1 | * | 1/2002 | Mita et al. .................. 320/112 |
| 6,579,642 B2 | | 6/2003 | Yamane et al. |
| 6,586,132 B1 | * | 7/2003 | Fukuda et al. .............. 429/120 |
| 7,141,331 B2 | * | 11/2006 | Ziegler et al. ............... 429/120 |
| 7,291,420 B2 | | 11/2007 | Bitsche et al. |
| 2001/0026886 A1 | * | 10/2001 | Inui et al. .................. 429/120 |
| 2002/0028376 A1 | * | 3/2002 | Yamane et al. ............. 429/120 |
| 2002/0030468 A1 | * | 3/2002 | Inui et al. .................. 320/112 |
| 2002/0076601 A1 | * | 6/2002 | Guthrie et al. .............. 429/39 |

(Continued)

FOREIGN PATENT DOCUMENTS

CN 1411095 A 4/2003

(Continued)

OTHER PUBLICATIONS

Patent Abstracts of Japan, Publication No. 2003-007355, dated Jan. 10, 2003, in the name of Daisuke Takahashi et al.

(Continued)

*Primary Examiner*—Edward Tso
*Assistant Examiner*—Arun Williams
(74) *Attorney, Agent, or Firm*—Christie, Parker & Hale, LLP

(57) ABSTRACT

A rechargeable battery module includes a plurality of unit cells; and a housing in which the unit cells are mounted and in which a coolant for controlling the temperature in the housing circulates. The unit cells are disposed in the housing on a slant at a predetermined angle with respect to an inflow of the coolant.

20 Claims, 18 Drawing Sheets

U.S. PATENT DOCUMENTS

| | | | |
|---|---|---|---|
| 2003/0017383 A1* | 1/2003 | Ura et al. | 429/120 |
| 2003/0054230 A1 | 3/2003 | Al-Hallaj et al. | |
| 2003/0087149 A1* | 5/2003 | Ando et al. | 429/120 |
| 2003/0118898 A1* | 6/2003 | Kimura et al. | 429/156 |
| 2003/0183374 A1* | 10/2003 | Voss et al. | 165/110 |
| 2003/0211384 A1* | 11/2003 | Hamada et al. | 429/120 |
| 2005/0058892 A1 | 3/2005 | Ovshinsky et al. | |
| 2005/0095499 A1* | 5/2005 | Kanai et al. | 429/83 |
| 2005/0231158 A1* | 10/2005 | Higashino | 320/112 |
| 2005/0274676 A1* | 12/2005 | Kumar et al. | 210/681 |
| 2006/0068250 A1* | 3/2006 | Bai et al. | 429/26 |

FOREIGN PATENT DOCUMENTS

| | | |
|---|---|---|
| JP | 45-003372 | 2/1970 |
| JP | 09-266016 | 10/1997 |
| JP | 09-306447 | 11/1997 |
| JP | 10-154494 | 6/1998 |
| JP | 2000-133225 | 5/2000 |
| JP | 2000-251953 | 9/2000 |
| JP | 2001-35461 | 2/2001 |
| JP | 2002-033137 | 1/2002 |
| JP | 2002-373710 | 12/2002 |
| JP | 2003-7355 A | 1/2003 |
| JP | 2003-132962 | 5/2003 |
| JP | 2004-31716 | 1/2004 |
| JP | 2004-235110 | 8/2004 |

OTHER PUBLICATIONS

Patent Abstracts fo Japan, Publication No. 2000-251953, dated Sep. 14, 2000, in the name of Mitsugi Takagi et al.

Patent Abstracts fo Japan, Publication No. 2001-035461, dated Feb. 9, 2001, in the name of Hiroaki Yoshida.

Patent Abstracts of Japan, Publication No. 2004-031716, dated Jan. 29, 2004, in the name of Shinya Kubota et al.

Patent Abstracts of Japan, Publication No. 2004-235110, dated Aug. 19, 2004, in the name of Tokuo Inamasu et al.

U.S. Office action dated Jul. 15, 2008, for related U.S. Appl. No. 11/388,525, indicating relevance of reference listed in this IDS.

Japanese Office action dated Sep. 1, 2009, for corresponding Japanese application 2006-074998, noting listed references in this IDS.

* cited by examiner

RECHARGEABLE BATTERY MODULE HAVING A COOLING MECHANISM

CROSS-REFERENCE TO RELATED APPLICATION

This application claims priority to and the benefit of Korean Patent Application No. 10-2005-0024867 filed in the Korean Intellectual Property Office on Mar. 25, 2005, the entire content of which is incorporated herein by reference.

BACKGROUND OF THE INVENTION

Unlike non-rechargeable batteries, rechargeable batteries can be repeatedly charged and discharged. Lower power batteries in which battery cells are made into a battery pack are used as the power source for various portable electronic devices such as cellular phones, laptop computers, and camcorders. Larger battery packs which are formed by connecting several to tens of the rechargeable battery cells may be suitable for motor driven devices such as hybrid electric vehicles.

Rechargeable batteries may be classified into different categories based on external shape, for example, cylindrical and prismatic shapes.

Such a rechargeable battery is assembled in series by connecting rechargeable batteries together to form a rechargeable battery module to be used for driving a motor of an electric vehicle that requires a large electrical power capacity.

The rechargeable battery module is typically composed of a plurality of rechargeable batteries (hereinafter, referred to as "unit cells" for convenience) connected in series.

Because a rechargeable battery module is constructed by interconnecting multiple unit cells, the heat generated at the respective unit cells needs to be dissipated well. Particularly when a battery module is used to drive a motor for a hybrid electric vehicle (HEV), it is important to have adequate heat dissipation. If heat is not dissipated properly, the heat generated from the unit cells causes a temperature variation among the unit cells. The heat generated at the unit cells may also cause the temperature inside the unit cells to increase, resulting in explosion thereof.

Particularly, since a battery module for an HEV is charged and discharged by a high current, it may have deteriorated performance due to the heat generated by the internal reaction of a rechargeable battery.

SUMMARY OF THE INVENTION

Various embodiments of the present invention provide a rechargeable battery module including a plurality of unit cells and having maximized cooling efficiency.

One embodiment of a rechargeable battery module includes a plurality of unit cells; and a housing in which the unit cells are mounted and in which a coolant for controlling the temperature in the housing circulates. The unit cells are disposed in the housing on a slant at a predetermined angle with respect to an inflow of the coolant.

The plurality of unit cells may be arranged at predetermined intervals to form a cell series, in which the unit cells are disposed on the slant against the inflow of the coolant. The plurality of unit cells are slanted at an angle of 15° to 45° against the inflow of the coolant.

The housing may also have protrusions on an internal surface thereof. The protrusions may be regularly or irregularly formed at predetermined intervals. The protrusions have a hemispherical, a truncated cone, a cone, or a polygonal pyramid shape or as a cylindrical or a polygonal column.

The plurality of unit cells may be positioned along a line to form a cell series and the protrusions may be positioned along the line.

In one embodiment, an internal wall of the housing is formed as a plate having a corrugated portion, and the corrugated portion may have a cross-sectional shape selected from the group consisting of a circular arc, a triangle, and a rectangle.

In one embodiment, the housing has a supportive plate attached thereinside, and the supportive plate has a plurality of protrusions on its surface. The protrusions may be formed as cylinders. In another embodiment, the supportive plate has consecutive corrugated portions, which have a circular arc or a polygonal cross-section.

The plurality of unit cells may be arranged at predetermined intervals to form a plurality of cell series, and the supportive plate with the corrugated portions may be mounted between the cell series. The supportive plate may also include through-holes on its surface. The supportive plate may alternatively have protrusions.

In one embodiment, the battery module is adapted to drive a motor.

DETAILED DESCRIPTION OF THE EMBODIMENTS

Embodiments of the present invention will hereinafter be described in detail with reference to the accompanying drawings.

According to some embodiments of the present invention, a battery module uses air in a cooling method thereof. However, the present invention is not limited thereto, as a coolant fluid can also be used.

Figure 1:
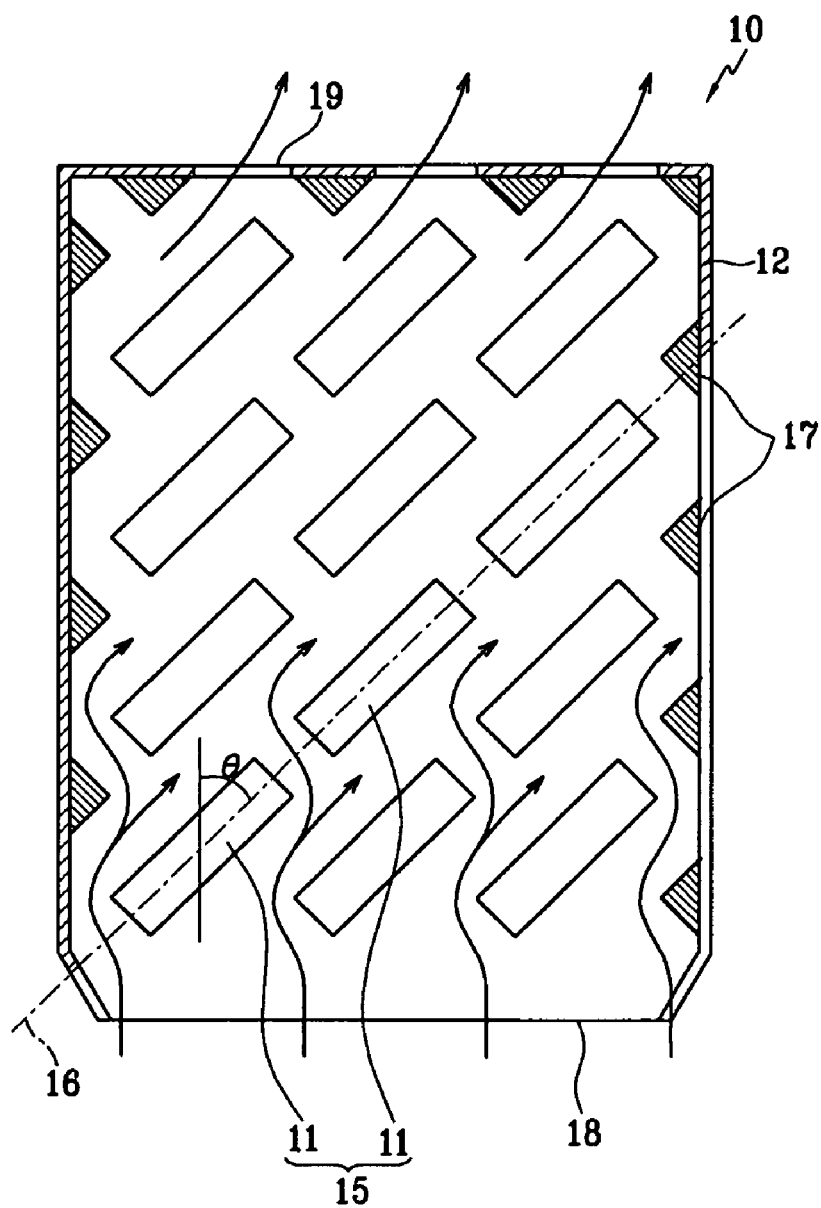
FIG. 1 is a schematic planar cross-sectional view illustrating the structure of a rechargeable battery module according to a first embodiment of the present invention.

FIG. 1 is a schematic planar cross-sectional view illustrating the structure of a rechargeable battery module according to a first embodiment of the present invention.

Referring to the drawing, a rechargeable battery module 10 includes a plurality of unit cells 11, which include an electrode assembly including positive and negative electrodes and a separator interposed therebetween and that generates electricity, and a housing 12, in which the unit cells 11 are mounted and air as a coolant (indicated by the arrows) is circulated.

According to this embodiment of the present invention, a prismatic rechargeable battery is used for each unit cell 11. The prismatic unit cells 11 are arranged at predetermined intervals inside the housing 12 to form a cell series 15. A plurality of the cell series 15 are disposed inside the housing 12, and the unit cells 11 in each cell series 15 are arranged at a predetermined angle (θ) with respect to the cooling airflow entering the housing 12.

In addition, the cell series 15 having the unit cells 11 at predetermined intervals can be disposed at a predetermined angle with the cooling air flow, so that the cell series 15 are also slanted at a predetermined angle with the cooling air flow.

Accordingly, the cooling air entering the housing 12 circulates along each unit cell 11 that is slanted with respect to the cooling air flow and is disturbed, generating a turbulent flow. The turbulent flow passes through the housing 12, covering all sides of the unit cells 11, which can maximize the cooling effect of the unit cells 11.

The housing 12 has an inlet 18 at one side, through which air for regulating the temperature of the unit cells 11 can flow in, and an outlet 19 at the other side thereof, through which the air passing by the unit cells 11 can dissipate. The housing 12 has no particular limit to its structure and the positions of the inlet 18 and the outlet 19, as long as the unit cells 11 inside the housing 12 are slanted with respect to the cooling air inflow at a predetermined angle. There is also no particular limit to the angle (θ) at which the unit cells 11 are disposed with respect to the cooling air inflow, but, in some embodiments, the angle is in a range of 15° to 45°.

The structure of the housing 12 facilitates the cooling air coming through the inlet 18 to pass between the housing and the unit cells 11, and also between the unit cells 11, and facilitate it flowing toward the outlet 19. In this way, the heat generated by the unit cells 11 is transferred to the cooling air which heats the air, and the heated air is dissipated through the outlet 19 of the housing 12.

In addition, according to this embodiment of the present invention, the housing 12 has a plurality of protrusions 17 formed at predetermined intervals on a side of the internal surface thereof. Accordingly, the cooling air entering the housing 12 collides with the protrusions 17, while passing between the internal wall thereof and the unit cells 11, generating a turbulent flow. The turbulent flow is uniformly formed among the unit cells that are slanted with respect to the air inflow. Therefore, the cooling air is uniformly transferred to each unit cell 11 along the turbulent flow, resolving local thermal imbalances in the entire battery module 10.

Here, the protrusions 17 may be formed on any internal wall of the housing 12 whether it be a side, a bottom, or a top thereof, so long as they contact the cooling air entering the housing 12. In addition, the protrusions 17 are formed to correspond with the disposition of the prismatic unit cells as shown in FIG. 1, according to this embodiment of the present invention. In other words, the protrusions 17 are only formed on a line 16, which extends from the cell series 15 including each unit cell 11 and that is slanted with respect to the air flow proceeding into the housing 12, at a predetermined distance from the unit cells 11. The above structure facilitates the circulation of cooling air between the unit cells 11 and the protrusions 17 to form a turbulent flow and to smoothly maintain the flow between the unit cells 11.

Figure 2:
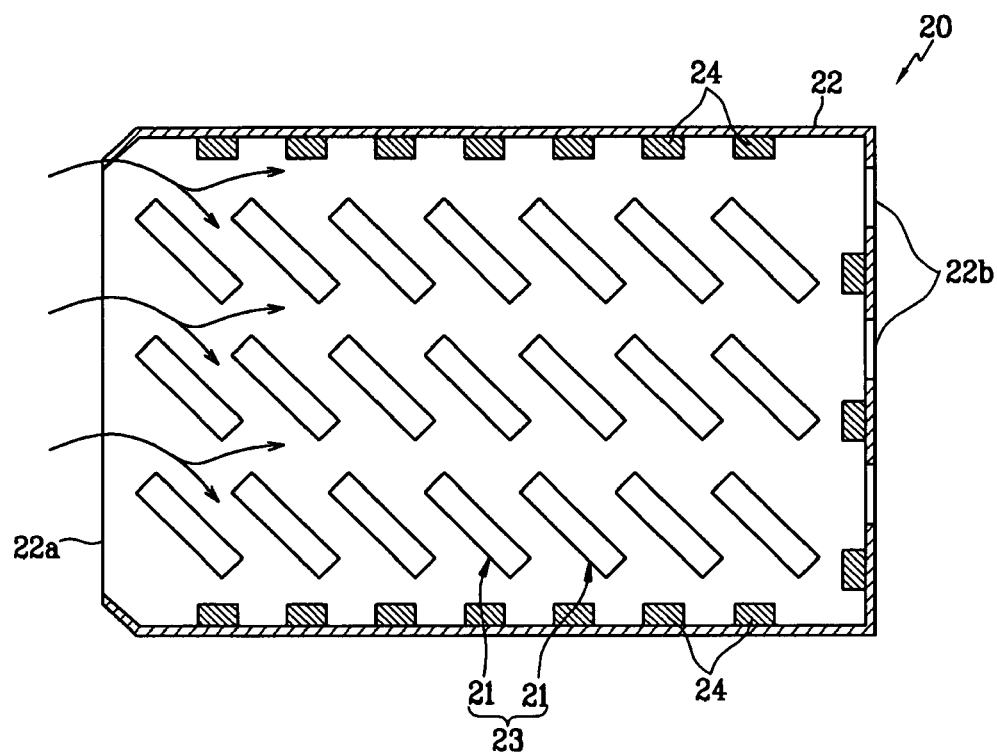
FIG. 2 is a schematic planar cross-sectional view illustrating the structure of a rechargeable battery module according to a second embodiment of the present invention.

FIG. 2 is a planar cross-sectional view illustrating a rechargeable battery module according to the second embodiment of the present invention.

Referring to the drawing, the rechargeable battery module 20 has a plurality of cell series 23 in which a plurality of unit cells 21 are disposed in parallel inside a housing 22. The housing 22 has an inlet 22a through which the cooling air enters and an outlet 22b through which the cooling air exits, on two opposing sides thereof. The housing 22 also has protrusions 24 at particular intervals on the internal wall thereof that are not related to the disposition structure of the unit cells 21.

Figure 3:
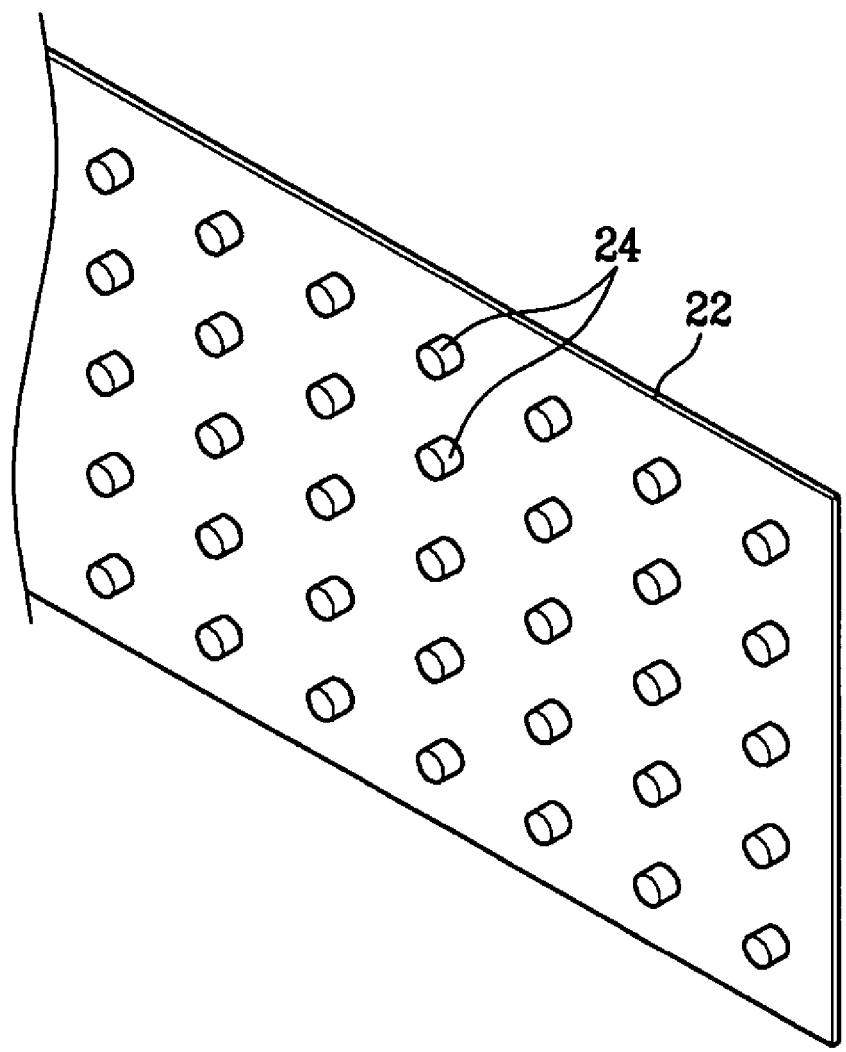
FIG. 3 is a partial perspective view illustrating an internal wall of the housing shown in FIG. 2.
Figure 4:
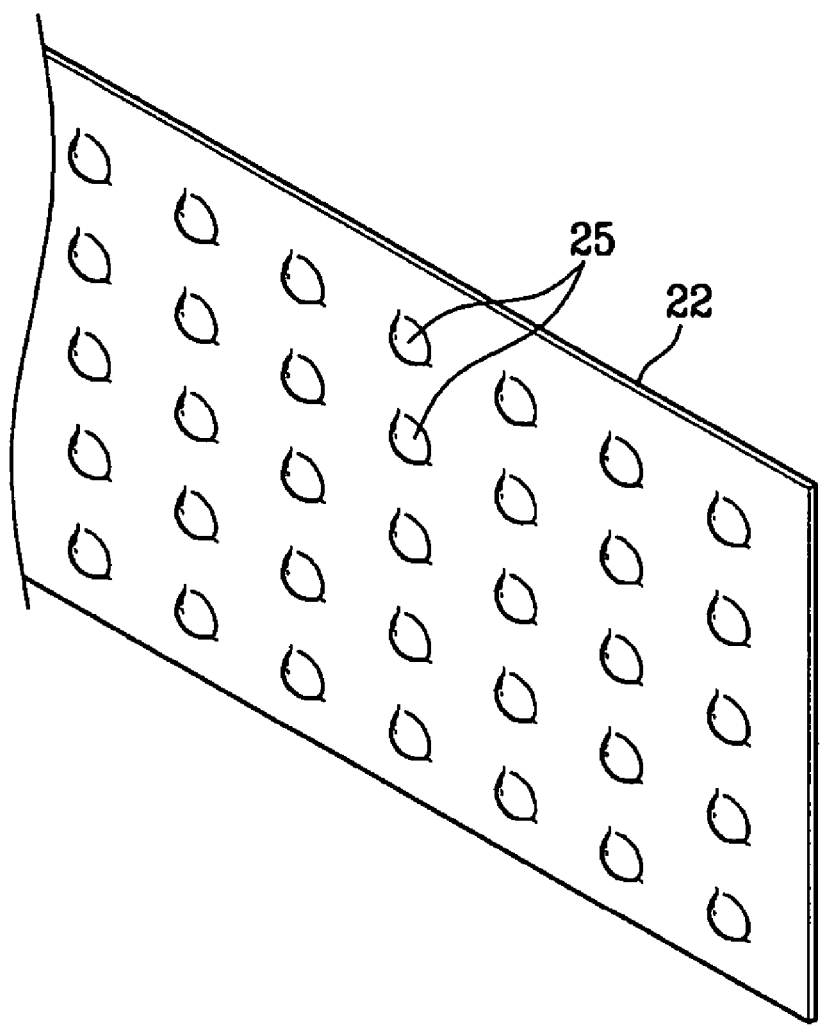
FIGS. 4 to 8 are partial perspective views illustrating various embodiments of an internal wall of the housing of rechargeable battery modules according to the present invention.
Figure 5:
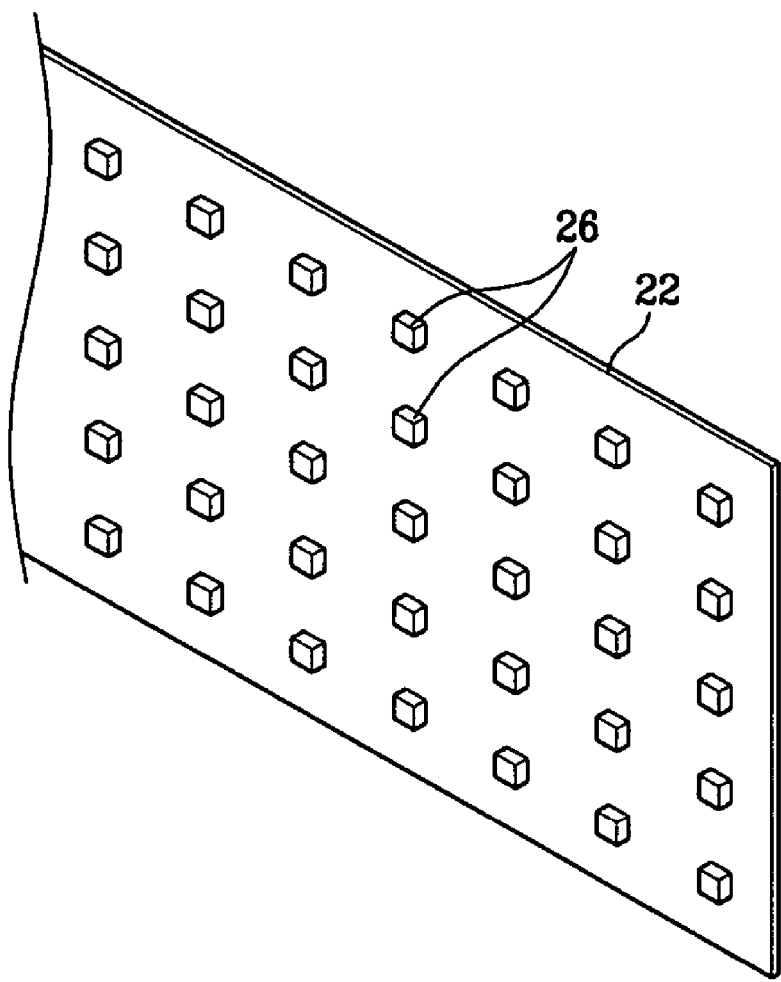
Figure 6:
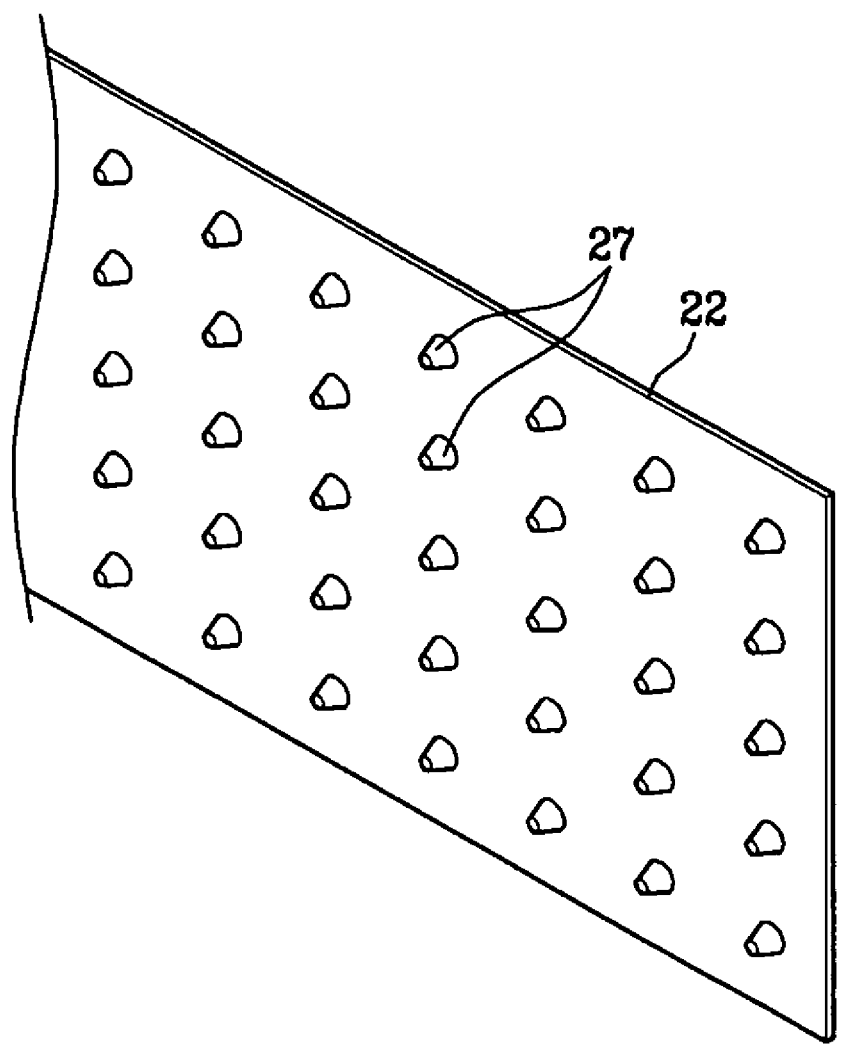
Figure 7:
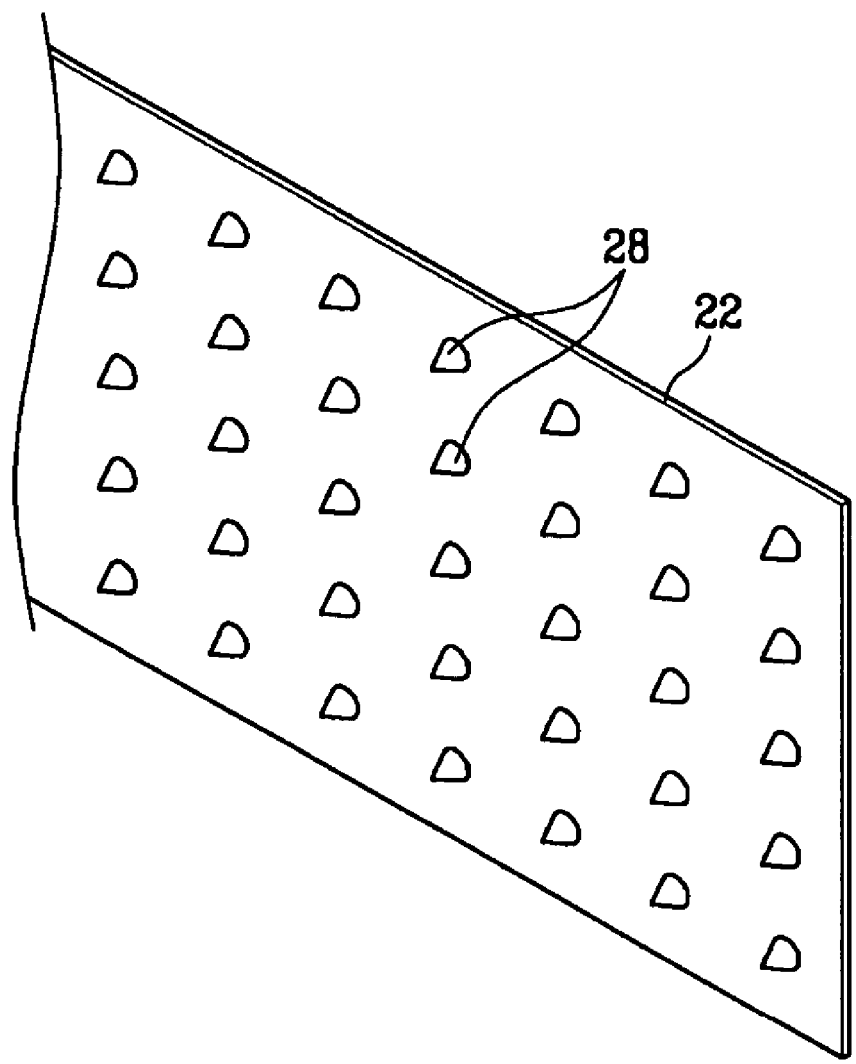
Figure 8:
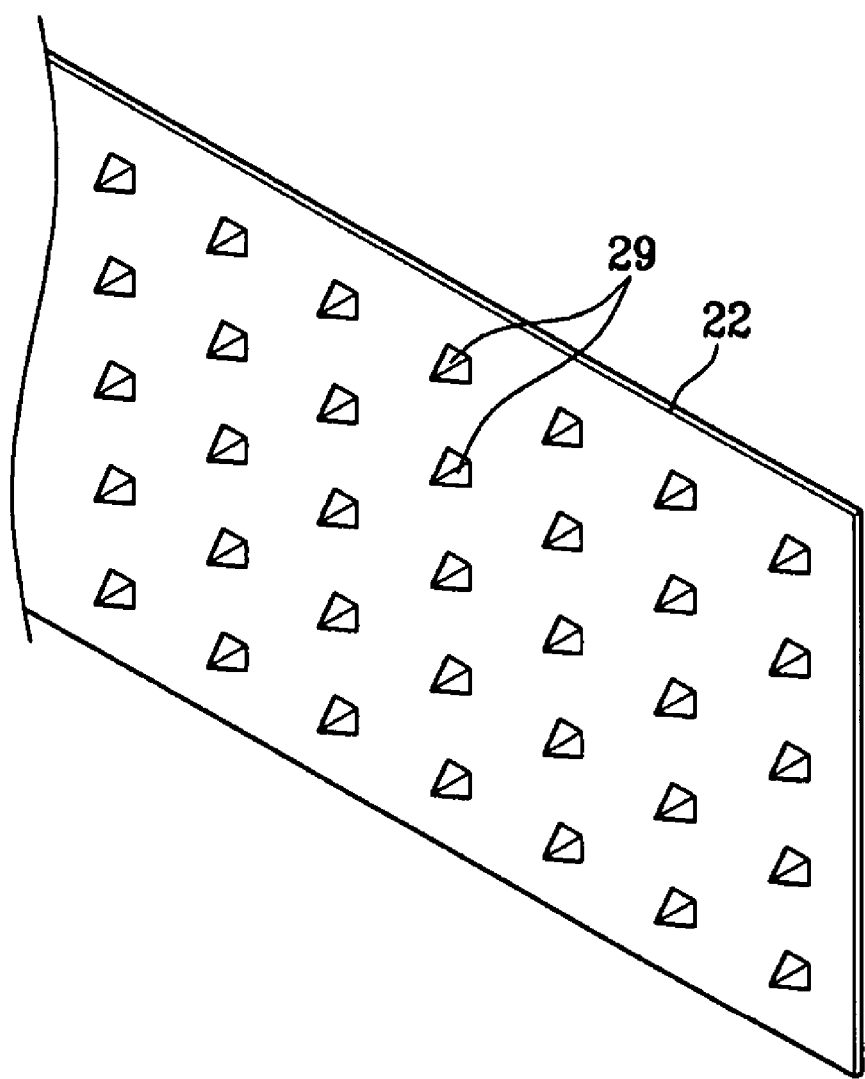

Referring to FIG. 3, the protrusions 24 according to this embodiment of the present invention have a cylindrical shape, but their height from bottom to top can vary, depending on the interval between the housing 22 and the unit cells 21. Therefore, the protrusions 24 are formed to have an appropriate height according to the design of the rechargeable battery module 20.

FIGS. 4 to 8 are partial perspective views illustrating the internal wall of a housing according to additional embodiments of the present invention.

The protrusions on the housing 22 can alternatively be formed in a hemispherical shape 25, a rectangular prism shape 26, a truncated cone shape 27, a cone shape 28, or a pyramid shape 29.

Figure 9:
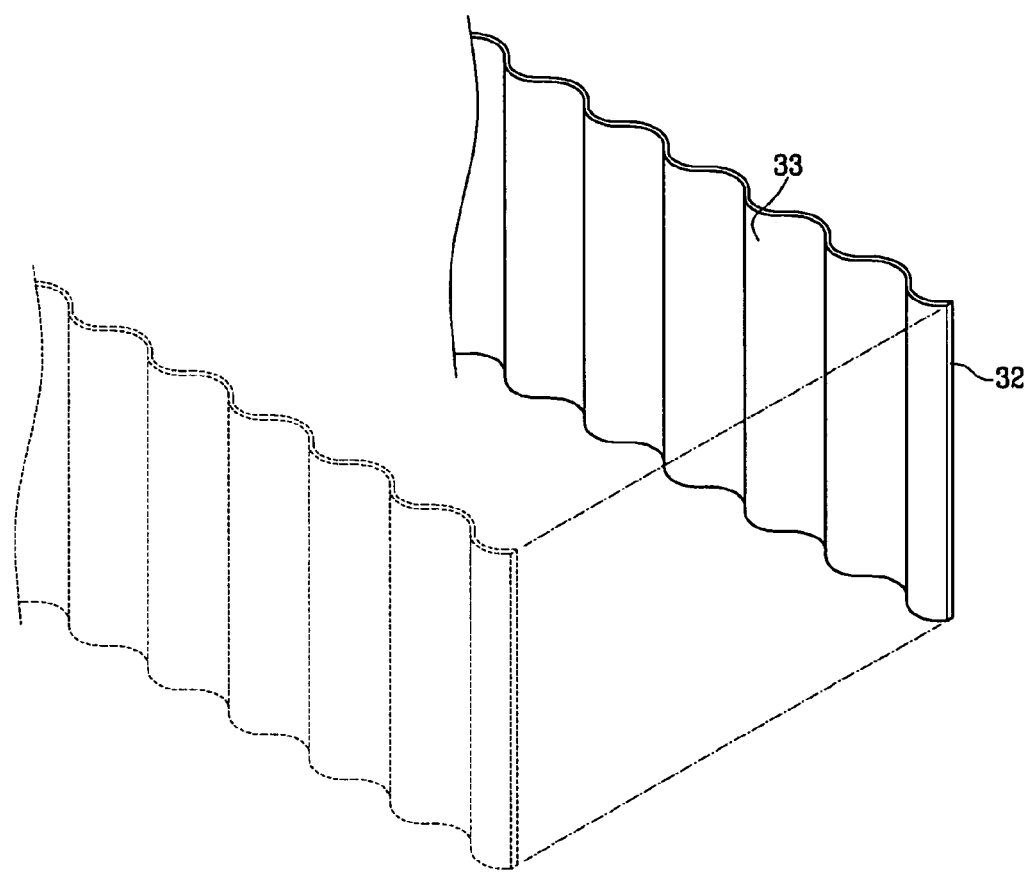
FIGS. 9 to 11 are partial perspective views illustrating an internal wall of the housing of rechargeable battery modules according various, additional embodiments of the present invention.
Figure 10:
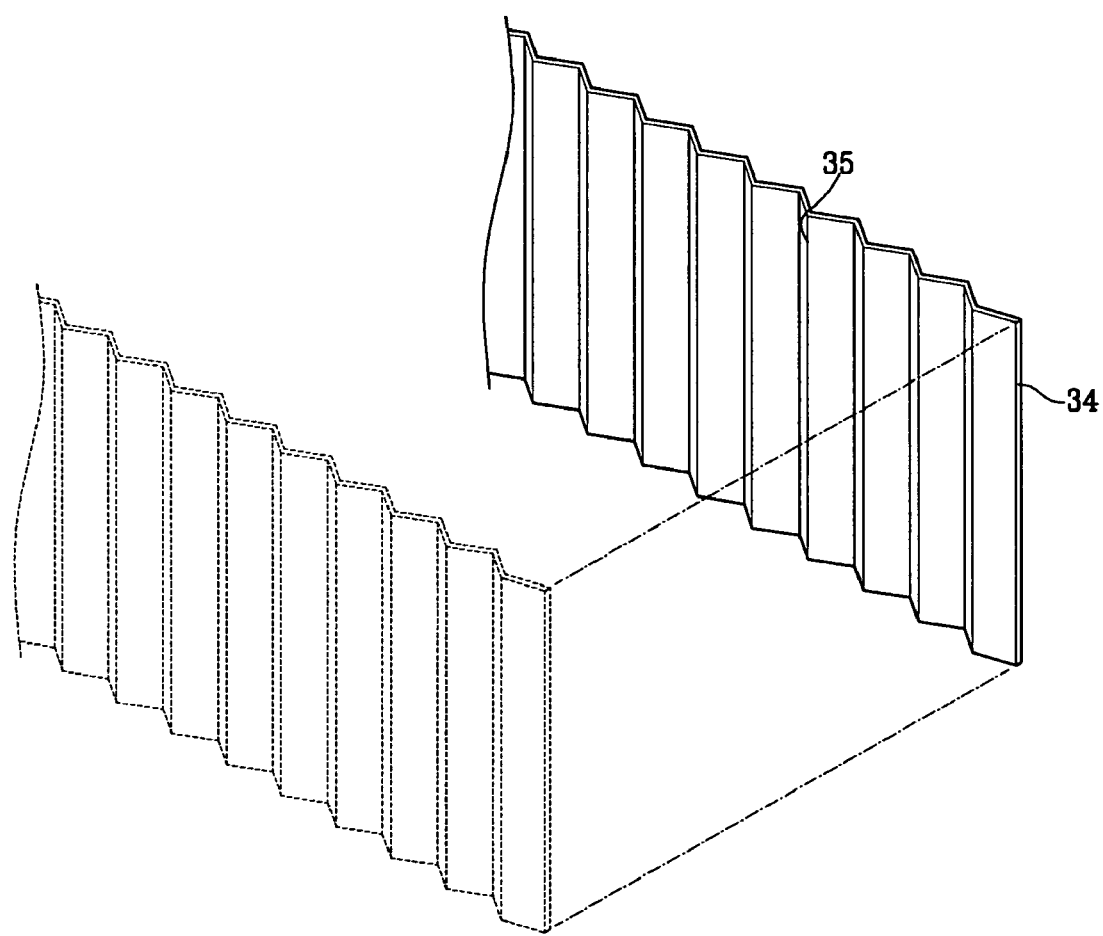
Figure 11:
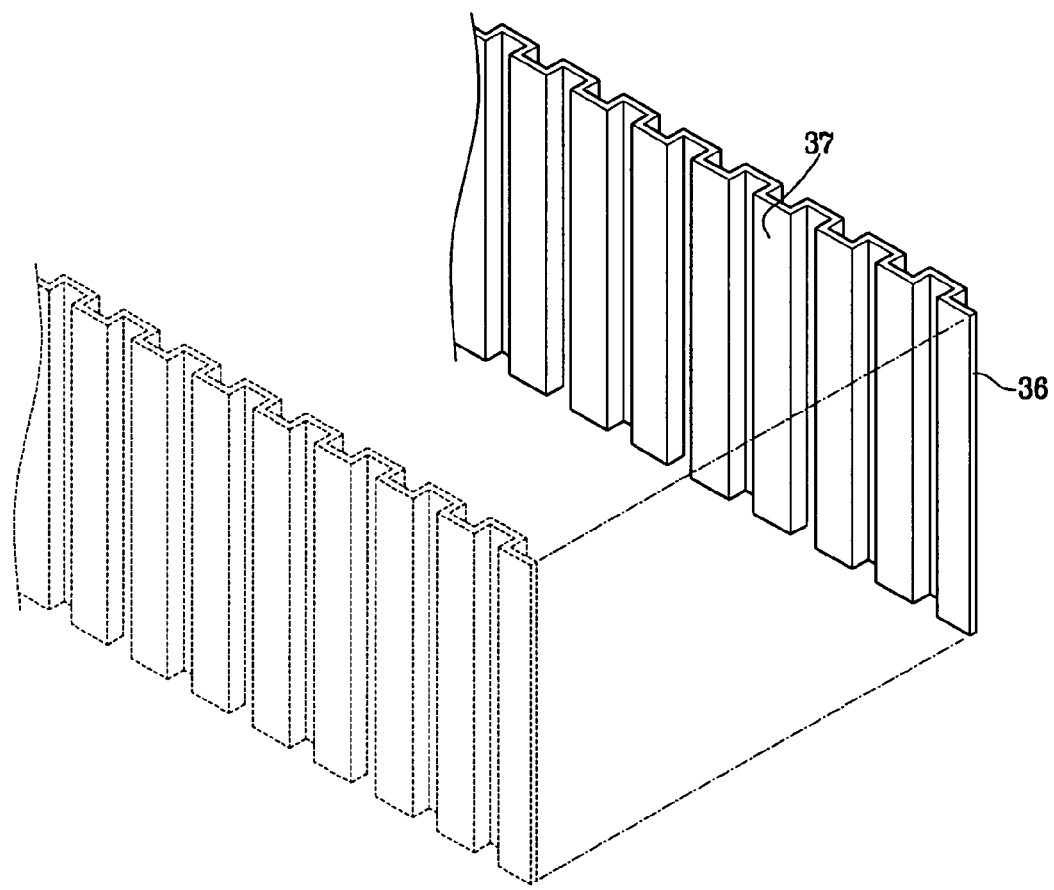

FIGS. 9 to 11 are partial perspective views illustrating a housing according to various embodiments of the present invention. Referring to FIG. 9, the housing 32 for mounting unit cells has arc-shaped corrugated portions 33 formed as a plate and functioning as the internal surface of the housing. That is to say, the arc-shaped corrugated portions 33 are consecutively formed on the internal wall of the housing 32.

Therefore, cooling air entering the housing 32 collides with the arc-shaped corrugated portions 33 formed on the internal wall of the housing 32 and is disturbed, which generates a turbulent flow that uniformly flows among the unit cells 11. The arc-shaped corrugated portions 33, in this embodiment, oppose the cooling air flow, so that the air can collide therewith. The arc-shaped corrugated portions 33 are not particularly limited as to the number thereof, and they do not need to be regularly distributed.

The housing 32 is not limited to the shape illustrated in FIG. 9. That is to say, as shown in FIG. 10, a housing 34 can be formed to have triangular-shaped corrugated portions 35, or as shown in FIG. 11, a housing 36 can have square-shaped corrugated portions 37 on the internal wall.

Figure 12:
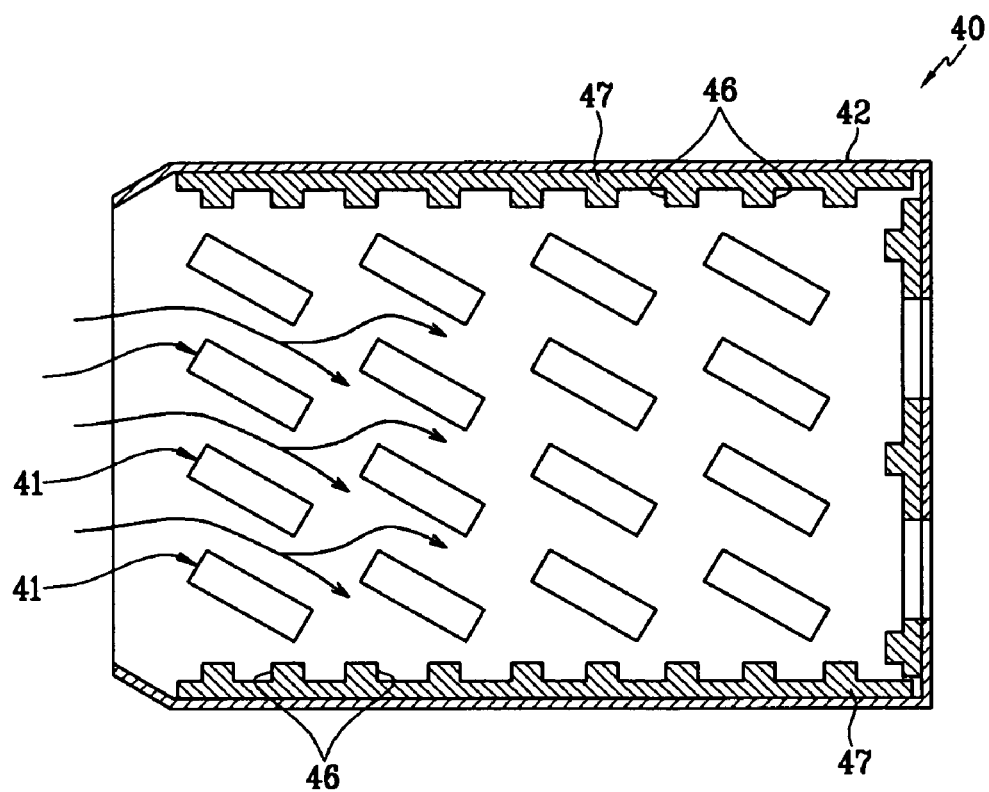
FIG. 12 is a planar cross-sectional view illustrating a rechargeable battery module according to an embodiment of the present invention.

FIG. 12 is a planar cross-sectional view illustrating a rechargeable battery module according to another embodiment of the present invention. According to the drawing, a battery module 40 includes unit cells 41 as electricity generating units, each of which includes an electrode assembly including a positive and negative electrode and a separator interposed therebetween, and a housing 42 for mounting the unit cells 41. The housing 42 has a supportive plate 47 mounted thereinside, and a plurality of protrusions 46 unilaterally formed at predetermined intervals on the surface of the supportive plate 47.

The supportive plate 47 may be formed of the same material as that of the housing 42. It can be mounted on any side of the housing 42 whether it be a side, a bottom, or a top thereof, but, in this embodiment, it is mounted on every side that contacts cooling air entering the housing 42.

Figure 13:
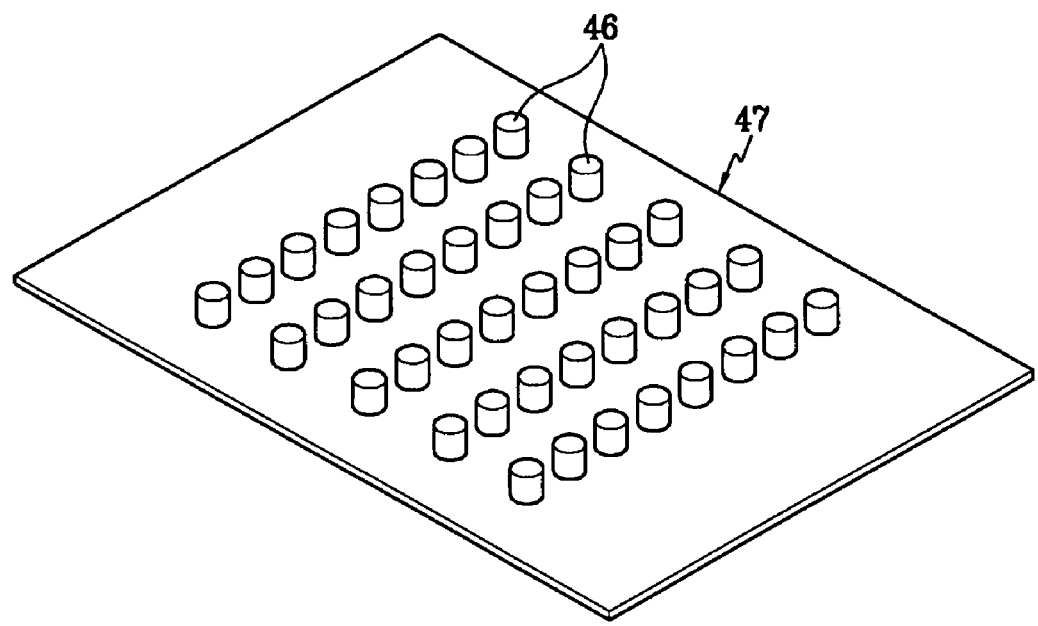
FIGS. 13 to 15 are perspective views illustrating a supportive plate mounted on the internal wall of the housing of rechargeable battery modules according to the additional embodiments of the present invention.

FIG. 13 shows the supportive plate 47 with protrusions 46 according to the embodiment shown in FIG. 12. As shown in FIG. 13, the protrusions 46 are formed as a cylinder. The protrusions 46 can have various heights, depending on the distance between the supportive plate 47 and the unit cells 41. Accordingly, the height can be appropriately regulated according to the design of the rechargeable battery module.

Alternatively, the protrusions 46 can have a hemispherical shape, a cube shape, a cone shape, or a polygonal prism shape rather than the above cylindrical shape, as shown in the previous drawings, and there is no particular limit thereto.

Figure 14:
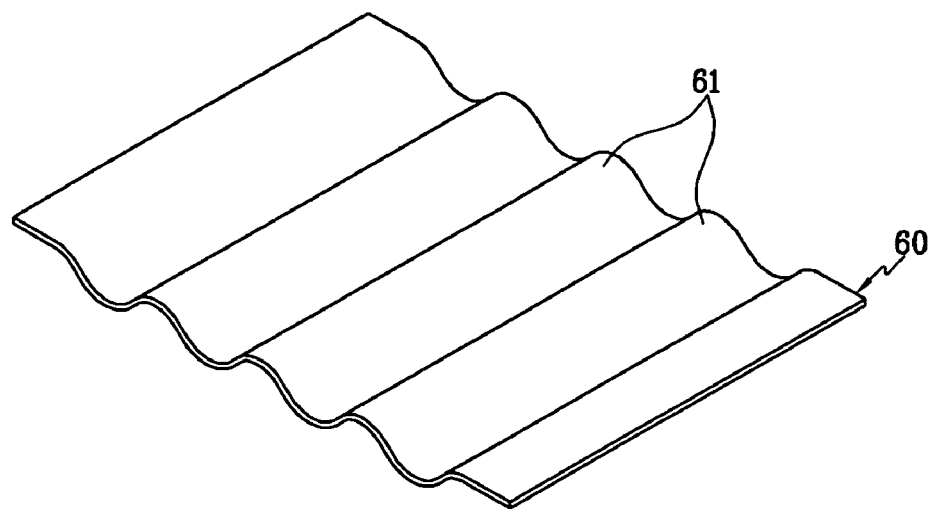
Figure 15:
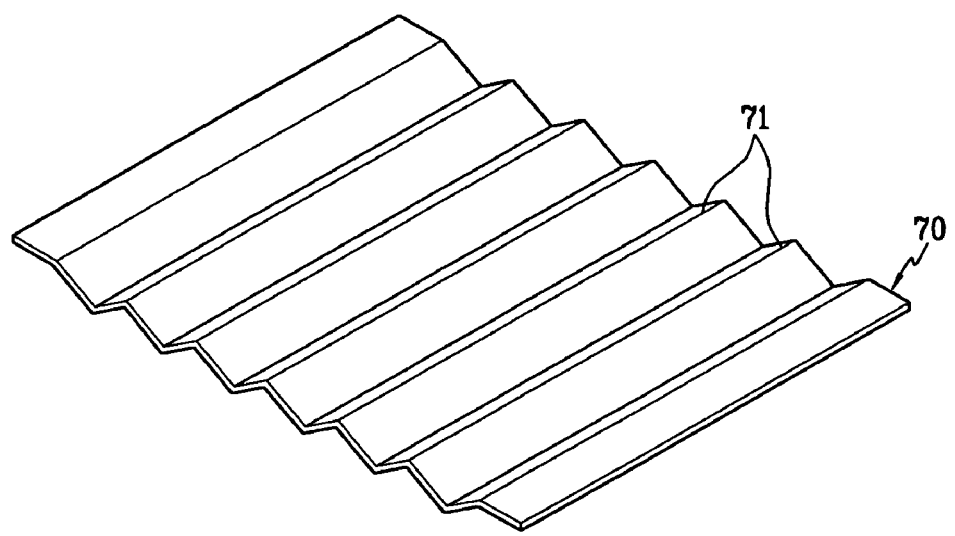

FIGS. 14 and 15 are perspective views illustrating supportive plates according to various, additional embodiments.

Referring to FIG. 14, the supportive plate 60 has arc-shaped corrugated portions 61 formed as a plate, instead of protrusions. In other words, the arc-shaped corrugated portions 61 are unilaterally and consecutively formed as circular arc shapes on the front side of the plate-shaped supportive plate 60.

In this way, cooling air entering the housing 42 collides with the arc-shaped corrugated portions 61 on the surface of the supportive plate 60 mounted on the internal wall of the housing 42 and its flow is disturbed, generating a turbulent flow, while it passes between the internal wall of the housing 42 and the unit cells 41. Therefore, the turbulent flow can be uniformly distributed among the unit cells 41.

Alternatively, as shown in FIG. 15, a supportive plate 70 has triangular-shaped corrugated portions 71 on its surface. The corrugated portions 61 and 71 are not limited to the aforementioned structures, but can also be formed with a polygonal shape, such as a rectangular shape. In addition, the corrugated portions 61 and 71 have no particular limit as to their number, and their distribution can be regular or irregular.

Figure 16:
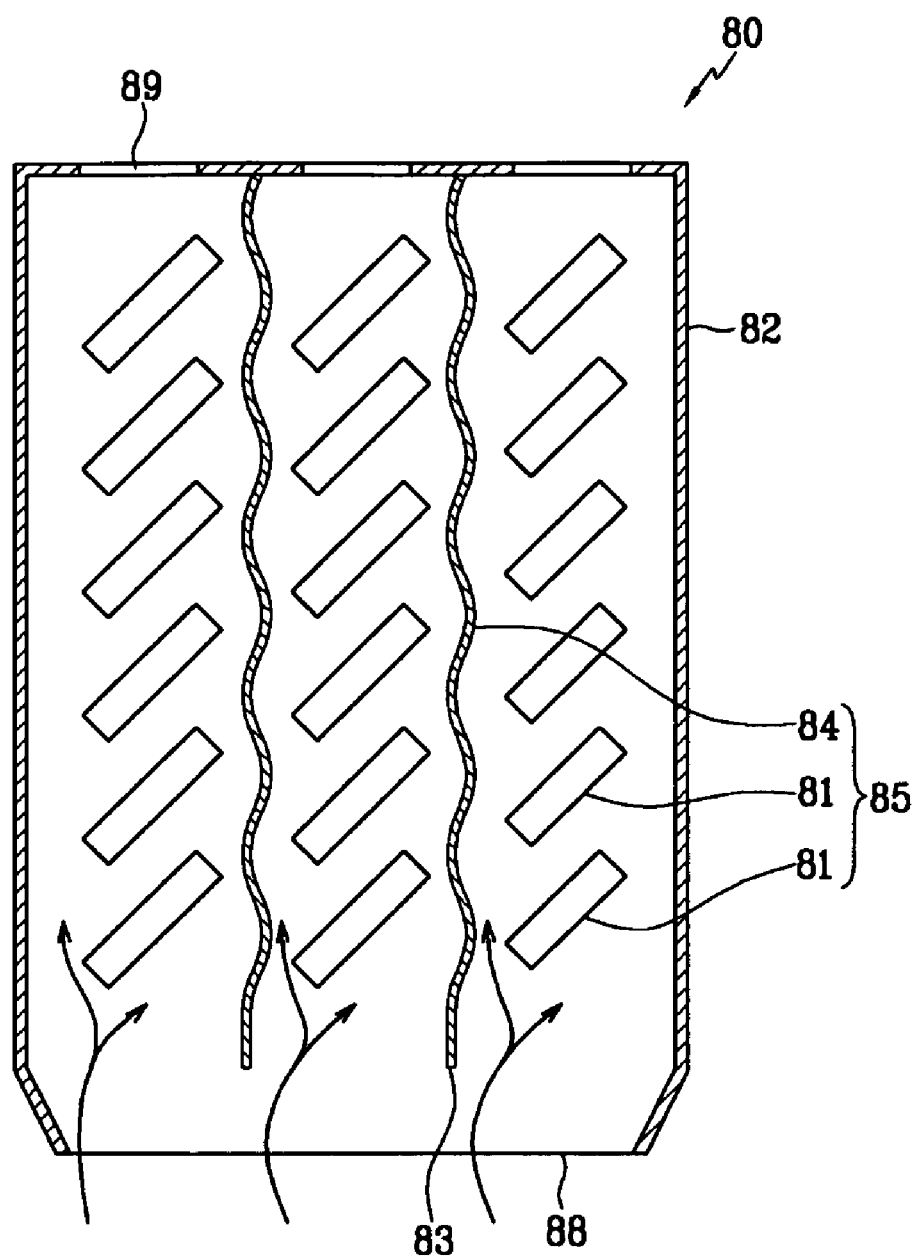
FIG. 16 is a planar cross-sectional view illustrating a rechargeable battery module according to another embodiment of the present invention.
Figure 17:
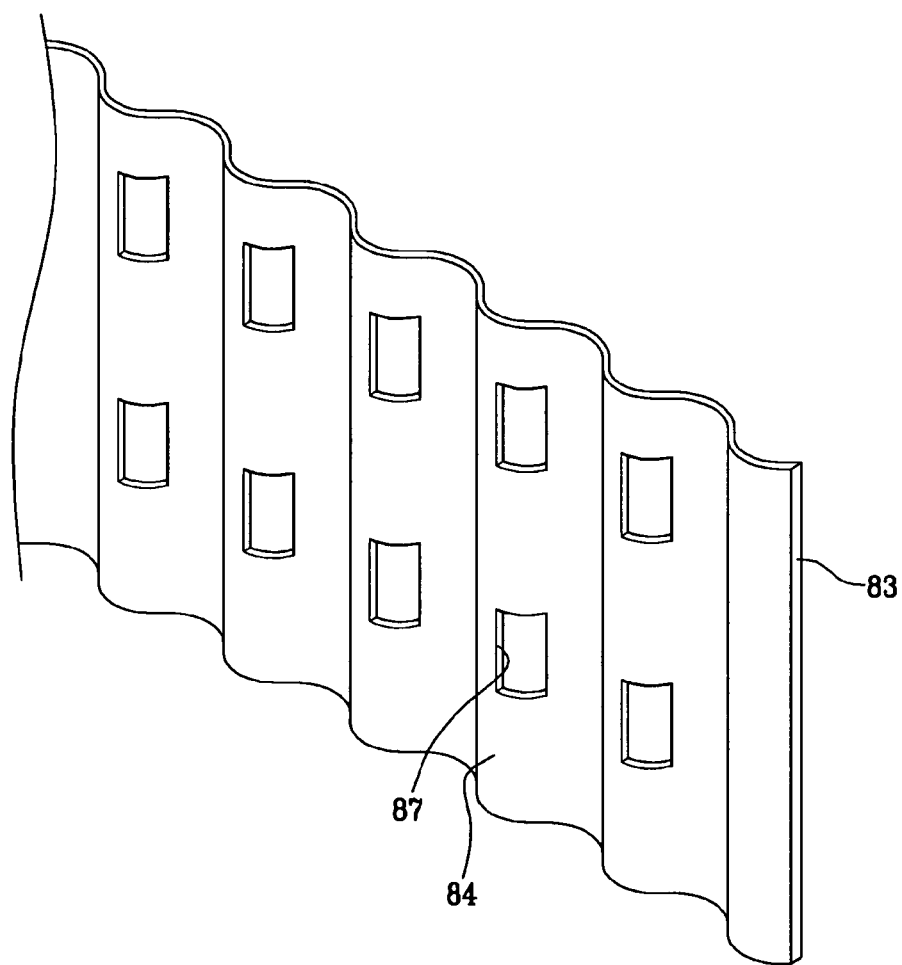
FIG. 17 is a perspective view illustrating a supportive plate mounted in a rechargeable battery module according to the embodiment shown in FIG. 16.

FIG. 16 is a planar cross-sectional view illustrating a rechargeable battery module according to another embodiment of the present invention, and FIG. 17 is a perspective view illustrating a supportive plate of the rechargeable battery module according to the embodiment shown in FIG. 16.

Referring to FIGS. 16 and 17, the rechargeable battery module 80 includes unit cells 81 and a housing 82 for mounting the unit cells 81. A plurality of unit cells 81 are arranged in parallel to form a cell series 85. There are a plurality of the cell series 85. The housing 82 has an inlet 88 through which cooling air can flow in and an outlet 89 through which the cooling air is dissipated.

In addition, a supportive plate 83 with arc-shaped corrugated portions 84 is mounted between the neighboring cell series 85. The supportive plate 83 is formed by consecutively connecting the arc-shaped corrugated portions 84. However, the corrugated portions 84 are not limited to the circular arc shape but can have various shapes, such as a triangle or a rectangle (as shown in the previous drawings).

According to this embodiment of the present invention, cooling air entering the housing 82 collides with the supportive plate 83 and is disturbed, generating a turbulent flow of the cooling air. Then, the turbulent flow uniformly flows among the unit cells 81.

In addition, the supportive plate 83 has a plurality of through-holes 87 through which the cooling air can pass. Accordingly, the cooling air can freely flow among the cell series 85 through the through-holes.

Figure 18:
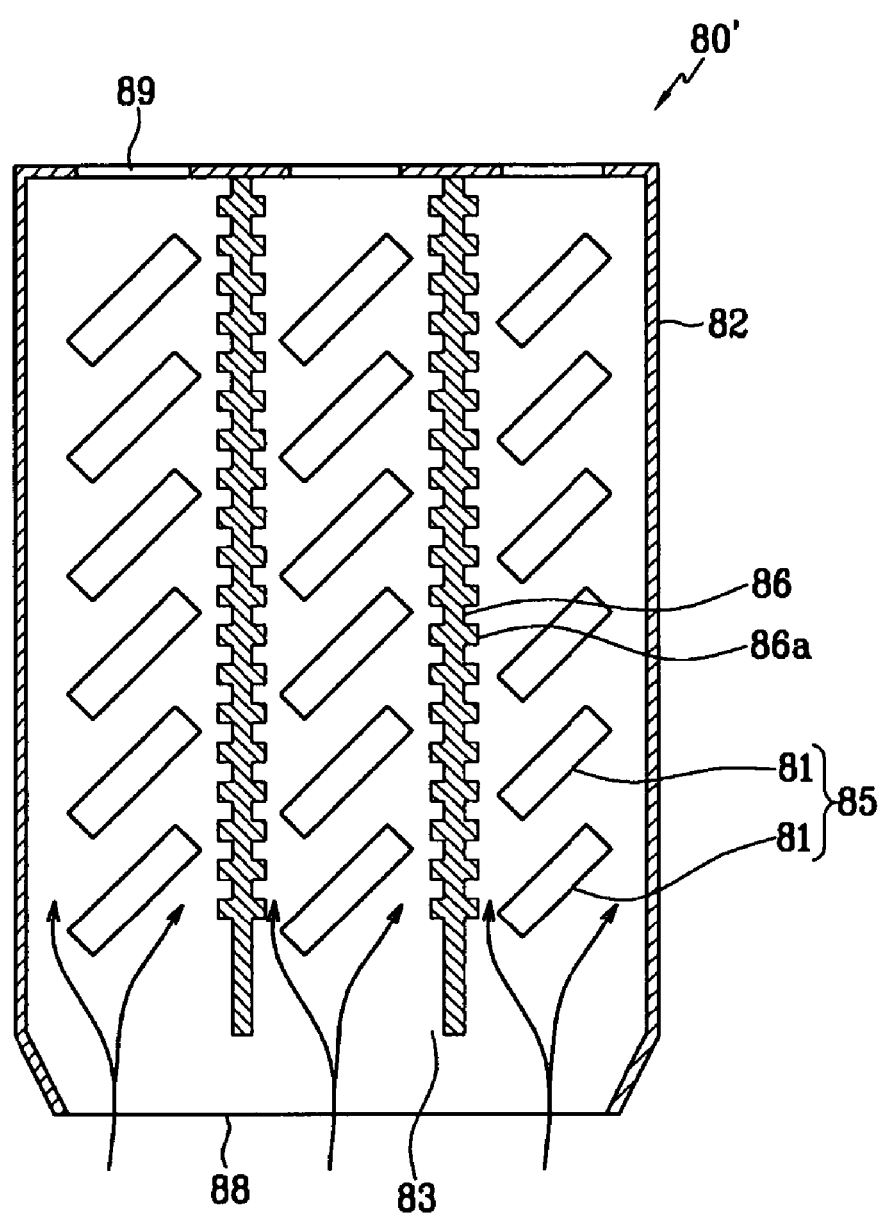
FIG. 18 is a planar cross-sectional view illustrating a rechargeable battery module according to another embodiment of the present invention.

FIG. 18 is a planar cross-sectional view illustrating another embodiment of a rechargeable battery module 80' of the present invention. According to the drawing, a supportive plate 86 mounted between cell series 85 has a plurality of protrusions 86a on its surface. Here, the protrusions 86a are formed on both sides of the supportive plate 86, but the invention has no particular limit to their sizes and shapes.

Figure 19:
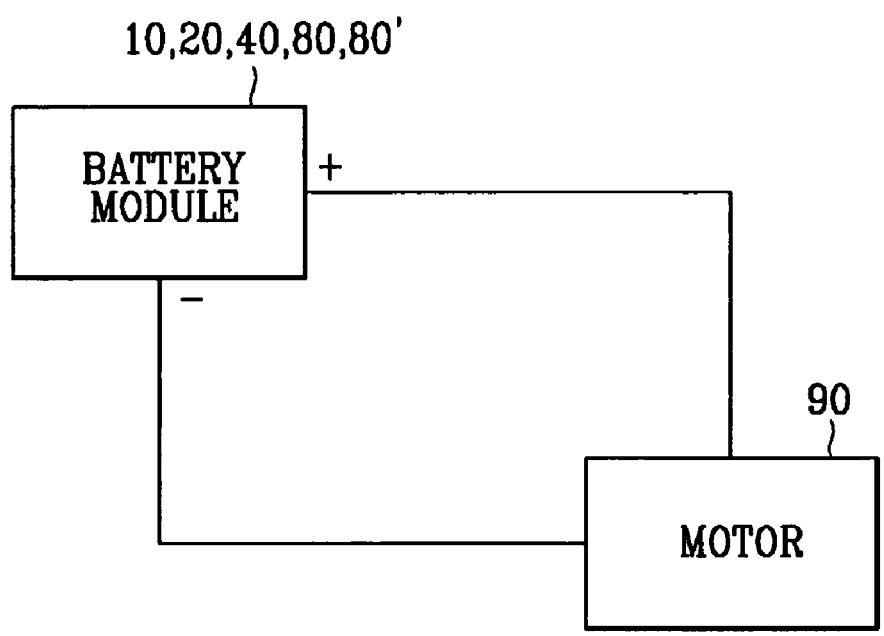
FIG. 19 is a schematic block chart illustrating how a rechargeable battery module is connected with a motor according to one embodiment of the present invention.

FIG. 19 is a schematic block chart showing how a battery module (10, 20, 40, 80, 80') illustrated in the drawings are connected with a motor 90.

According to various embodiments of the present invention, unit cells can have improved cooling efficiency by varying the disposition angle at which the unit cells are disposed in the housing, so that the coolant flow can be dissipated by the unit cells and changed to a turbulent flow. In addition, the unit cells can be more effectively cooled by improving the internal wall structure in the housing, so that the coolant passing through the battery module can change its flow. Furthermore, since the coolant uniformly circulates among unit cells, the entire battery module can be free from local thermal imbalances.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A rechargeable battery module comprising:
   a plurality of unit cells, each of the plurality of unit cells having at least one substantially flat side wall; and
   a housing for the plurality of unit cells, the housing comprising a plurality of side walls and being configured to permit flow of a coolant in an inflow direction for controlling the temperature in the housing,
   wherein the at least one substantially flat side wall of each of the plurality of unit cells in the housing is oriented at an acute angle to the inflow direction of the coolant and
   wherein at least two of the plurality of side walls each have a plurality of protrusions protruding generally toward the plurality of unit cells, wherein the plurality of protrusions on each of the side walls are spaced along a length of that side wall.

2. The rechargeable battery module of claim 1, wherein the plurality of unit cells comprises a cell series.

3. The rechargeable battery module of claim 1, wherein the at least one substantially flat side wall of each of the plurality of unit cells is oriented at an angle from about 15° to 45° with respect to the inflow direction of the coolant.

4. The rechargeable battery module of claim 1, wherein the plurality of protrusions are spaced at regular intervals.

5. The rechargeable battery module of claim 1, wherein the plurality of protrusions are spaced at irregular intervals.

6. The rechargeable battery module of claim 1, wherein the plurality of unit cells are oriented along a line and the plurality of protrusions are aligned with the line.

7. The rechargeable battery module of claim 1, wherein the plurality of protrusions have a hemispherical shape.

8. The rechargeable battery module of claim 1, wherein plurality of the protrusions are a cylindrical column or a polygonal column.

9. The rechargeable battery module of claim 1, wherein the plurality of protrusions have a shape selected from the group consisting of a truncated cone, a cone, and a polygonal pyramid.

10. The rechargeable battery module of claim 1, wherein the plurality of protrusions are integral with and extend along a height of the respective one of the at least two of the plurality of side walls to form a corrugated side wall.

11. The rechargeable battery module of claim 10, wherein each of the plurality of protrusions have a cross-sectional shape selected from the group consisting of an arc, a triangle, and a rectangle.

12. The rechargeable battery module of claim 1, wherein the housing includes an internal supportive plate having a plurality of second protrusions.

13. The rechargeable battery module of claim 12, wherein the plurality of second protrusions are cylinders.

14. The rechargeable battery module of claim 1, wherein a corrugated supportive plate is attached inside the housing.

15. The rechargeable battery module of claim 14, wherein the corrugated supportive plate has corrugations having an arc-shaped cross-section or a polygonal cross-section.

16. The rechargeable battery module of claim 1, wherein the plurality of unit cells are spaced and aligned in a plurality of cell series, and a corrugated supportive plate is between two of the plurality of cell series.

17. The rechargeable battery module of claim 16, wherein the corrugated supportive plate has through-holes.

18. The rechargeable battery module of claim 1, wherein the plurality of unit cells are spaced and aligned in a plurality of cell series, and a supportive plate having protrusions is mounted between two of the plurality of cell series.

19. The rechargeable battery module of claim 1, wherein the battery module is configured to drive a motor.

20. The rechargeable battery module of claim 1, wherein each of the plurality of unit cells is hexahedral.

* * * * *